(12) United States Patent
Barber (10) Patent No.: US 7,782,229 B1
(45) Date of Patent: Aug. 24, 2010

(54) REQUIRED NAVIGATION PERFORMANCE (RNP) SCALES FOR INDICATING PERMISSIBLE FLIGHT TECHNICAL ERROR (FTE)

(75) Inventor: Sarah Barber, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 557 days.

(21) Appl. No.: 11/824,140

(22) Filed: Jun. 28, 2007

(51) Int. Cl.
*G01C 21/00* (2006.01)

(52) U.S. Cl. .................. 340/979; 340/971; 340/945; 701/1

(58) Field of Classification Search .......... 340/979, 340/945, 963, 973; 73/178; 244/175; 701/1
See application file for complete search history.

(56) References Cited

U.S. PATENT DOCUMENTS

| | | | | |
|---|---|---|---|---|
| 5,786,773 | A | * | 7/1998 | Murphy ................ 340/947 |
| 6,720,891 | B2 | * | 4/2004 | Chen et al. ............. 340/969 |
| 2003/0004619 | A1 | * | 1/2003 | Carriker et al. ........... 701/3 |
| 2004/0189492 | A1 | * | 9/2004 | Selk et al. .............. 340/973 |

* cited by examiner

*Primary Examiner*—Toan N Pham
*Assistant Examiner*—Kerri McNally
(74) *Attorney, Agent, or Firm*—Matthew J. Evans; Daniel M. Barbieri (57) ABSTRACT

The present invention is a flight deck system for promoting accurate navigation of an aircraft. The system includes a memory configured for storing position information for the aircraft. The system further includes a processor which is configured for being communicatively coupled with the memory, the processor also being configured for receiving the aircraft position information stored in the memory. The system also includes a display which is configured for being communicatively coupled with the processor. The display is further configured for displaying a scaled indicator, the scaled indicator having been output to the display by the processor, the scaled indicator being based upon the received aircraft position information. The scaled indicator includes: a current position indicator for indicating an estimated current position of the aircraft, a desired position indicator for indicating a desired navigational position for the aircraft, and an allowable Flight Technical Error (FTE) indicator for indicating allowable Flight Technical Error (FTE) for the aircraft. Further, the current position indicator, the desired position indicator, and the FTE indicator are suitable for use by a pilot of the aircraft in maintaining the aircraft within established navigational boundaries.

9 Claims, 5 Drawing Sheets

REQUIRED NAVIGATION PERFORMANCE (RNP) SCALES FOR INDICATING PERMISSIBLE FLIGHT TECHNICAL ERROR (FTE)

FIELD OF THE INVENTION

The present invention relates to the field of flight deck HMIs (Human-Machine Interfaces)/Situational Awareness Systems and particularly to Required Navigation Performance (RNP) Scales for indicating permissible Flight Technical Error (FTE).

BACKGROUND OF THE INVENTION

Goals for air traffic controllers and/or aircraft pilots may include: a) to more efficiently utilize airspace; and b) to promote the provision of safe takeoffs/landings for aircraft under a wide range of weather conditions. Required Navigation Performance (RNP) is a concept aimed at meeting these goals. Previously, an airplane's track-keeping and navigational capabilities were defined relative to ground-based navigation aids, such as VOR (Very high frequency Omni-directional Range) or NDB (Non-Directional radio Beacon). However, with RNP, an airplane's navigational capability is defined in terms of the performance and integrity of its installed on-board equipment. Accordingly, a number of navigation solutions may currently be implemented, such as satellite navigation systems (exs—GNSS (Global Navigation Satellite Systems) and GPS (Global Positioning Systems)), DME/DME (Distance Measuring Equipment) and/or VOR/DME, for providing an airplane with a certain degree of navigational precision/navigational capability. The higher the degree of navigational capability/performance of an aircraft, the more precisely the aircraft may be able to follow a predetermined ground track, thereby allowing for certain routes to be placed closer together and further allowing for more effective use of airspace. Also, improved navigational capability may allow for an approach to be precisely flown in the vicinity of terrain, resulting in lower approach minimums.

A related concept to RNP is Estimated Position Uncertainty (EPU), which is a value which may be calculated by an airplane's navigation system (ex—(FMS)-Flight Management System) to indicate the airplane's degree of position uncertainty due to such factors as the number of GPS satellites in view, or the accuracy of ground-based navigational aids (exs.—VOR, DME, etc.). An additional concept related to RNP is Flight Technical Error (FTE) which is the degree of precision with which an airplane may be flown (either manually or on autopilot) along a desired navigational track. Two types of routes that RNP-capable aircraft may utilize are: 1) RNAV (Area Navigation) routes and; 2) RNP routes.

RNAV routes require that an airplane's Total System Error (TSE), which is equal to the sum of EPU and FTE (i.e., TSE=EPU+FTE) is within 1* the RNAV value ninety-five percent (95%) of the time. For instance, with an RNAV 2 route (i.e., required RNAV performance is 2.0 Nautical Miles (NM)), if the position uncertainty (EPU) were 0.5 NM, a pilot would be allowed 1.5 NM of FTE to remain within the RNAV value (1* RNAV), the RNAV value being equal to 2.0 NM. Knowing the amount of FTE available to him/her in a given scenario may promote a pilot's ability to better maintain the required navigational track within the 1* RNAV boundaries. Further, if the pilot needed to deviate from a planned route for weather, an available indication as to just how far the pilot can deviate (i.e., the amount of FTE available), while staying within the 1×RNAV boundary would allow the pilot to make such deviation without having to make a specific request to ATC (Air Traffic Control), thereby promoting reduction of communication burdens for air traffic controllers/pilots.

RNP routes typically require that an airplane be within 1* RNP ninety-five percent (95%) of the time. Also, RNP routes typically have to provide monitoring and alerting to ensure that the probability of the aircraft exceeding 2* RNP is no greater than 10E-7. For example, with certain approaches, where the RNP value can be as low as 0.1 NM, this equates to only 607 feet to the 95% boundary (ex—the 1* RNP boundary) and 1214 feet to the alerting boundary (ex—the 2×RNP boundary).

A number of on-board navigation solutions, such as lateral and vertical deviation indicators (ex—CDIs (Course Deviation Indicators)) and navigation performance scales for indicating EPU and allowable FTE are currently available. These currently available solutions are aimed at making it easier for pilots to maintain an aircraft on course (ex—within the 1* RNP/RNAV boundaries). However, the drawbacks of the currently available solutions are: a) they fail to explicitly indicate the allowable FTE (ex—allowable deviation), often limiting FTE by artificially reducing permitted deviation and; b) they lack the ability to indicate/provide an accurate location of an airplane which has navigated beyond the 1* RNP/RNAV boundaries.

Thus, it would be desirable to provide a navigation solution which addresses the problems associated with current solutions.

SUMMARY OF THE INVENTION

Accordingly, an embodiment of the present invention is directed to a system for promoting accurate navigation of an aircraft, the system including: a memory configured for storing position information for the aircraft; a processor configured for being communicatively coupled with the memory and being further configured for receiving the aircraft position information stored in the memory; and a display configured for being communicatively coupled with the processor, the display being further configured for displaying a scaled indicator, the scaled indicator being output to the display by the processor, the scaled indicator being based upon the received aircraft position information, the scaled indicator including a current position indicator, a desired position indicator and an allowable Flight Technical Error (FTE) indicator, the current position indicator being configured for indicating an estimated current position of the aircraft, the desired position indicator being configured for indicating a desired navigational position for the aircraft, the FTE indicator configured for indicating allowable Flight Technical Error (FTE) for the aircraft, wherein the current position indicator, the desired position indicator and the FTE indicator are suitable for use by a pilot of the aircraft in maintaining the aircraft within established navigational boundaries.

An additional embodiment of the present invention is directed to a method for promoting accurate navigation of an aircraft, said method including: providing a current position indicator configured for indicating an estimated current position of an aircraft; providing a desired position indicator configured for indicating a desired navigational position for the aircraft; and providing an allowable Flight Technical Error (FTE) indicator configured for indicating allowable Flight Technical Error (FTE) for the aircraft, wherein the current position indicator, the desired position indicator and the FTE indicator are suitable for use by a pilot of the aircraft in maintaining the aircraft within established navigational boundaries.

A further embodiment of the present invention is directed to a computer-readable medium having computer-executable instructions for performing a method for promoting accurate navigation of an aircraft, said method including: providing a current position indicator configured for indicating an estimated current position of an aircraft; providing a desired position indicator configured for indicating a desired navigational course for the aircraft; and providing an allowable Flight Technical Error (FTE) indicator configured for indicating allowable Flight Technical Error (FTE) for the aircraft, wherein the current position indicator, the desired position indicator and the FTE indicator are suitable for use by a pilot of the aircraft in maintaining the aircraft within established navigational boundaries.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
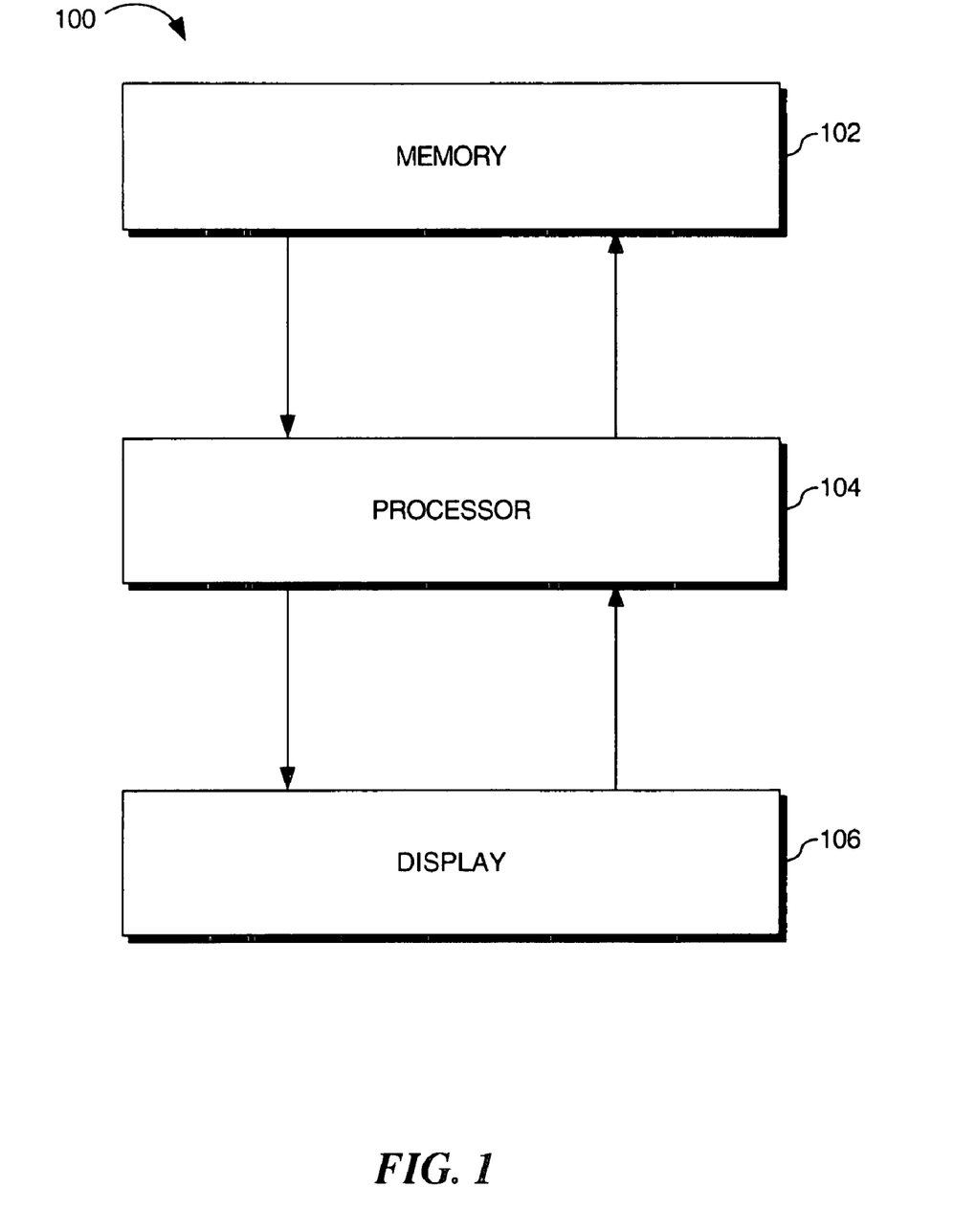
FIG. 1 is a block diagram schematic of a system for promoting accurate navigation of an aircraft in accordance with an exemplary embodiment of the present invention.

FIG. 1 is a block diagram schematic of a system in accordance with an exemplary embodiment of the present invention. In the illustrated embodiment, the system 100 includes a memory 102, a processor 104 and a display 106. The processor 104 is configured for being communicatively coupled with the memory 102. Further, the display 106 is configured for being communicatively coupled with the processor 104. In a current embodiment of the present invention, the system 100 is implemented as part of a flight deck system for promoting accurate navigation of an aircraft. The memory 102 is configured for storing position information for the aircraft. The processor 104 is configured for receiving the aircraft position information stored in the memory.

Figure 2A:
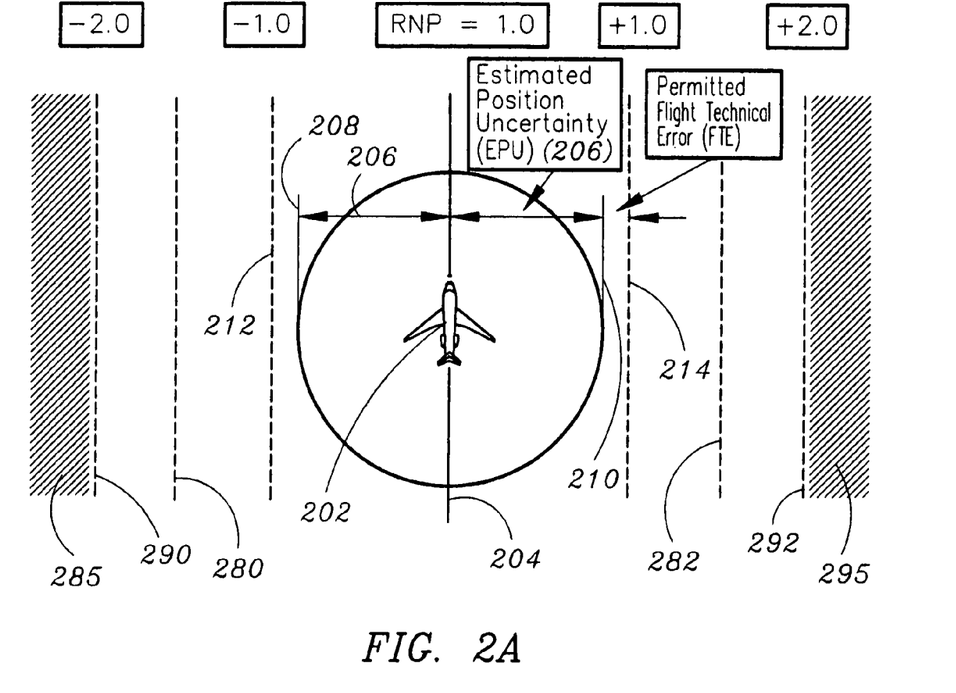
FIG. 2A is a diagram depicting positional information relative to a desired ground track for an airplane implementing the system of the present invention.

Referring to FIG. 2A, a diagram is shown which depicts positional information for an aircraft 202 (ex—airplane) relative to a desired course (ex—ground track 204), such as may be provided via a navigational display of the aircraft. FIG. 2A shows the airplane 202 at a current estimated location which is positioned along the desired course 204. However, as discussed previously, there may be some degree of uncertainty/disparity regarding the airplane's indicated/estimated current location and its possible actual location due to such factors as the number of GPS satellites in view, or the accuracy of ground-based navigational aids (exs.—VOR, DME, etc.). This degree of uncertainty is known as the EPU (Estimated Position Uncertainty) and is a value which may be calculated by the airplane's navigation system, such as a Flight Management System (FMS) to indicate the airplane's degree of position uncertainty with regards to the indicated current position. For example, for the aircraft 202 depicted in FIG. 2A, the EPU has been calculated as being equal to 0.9 NM (Nautical Miles), the equivalent of the radius 206 of the circle shown around the aircraft. Thus, for an aircraft having a current indicated position as shown in FIG. 2A (ex—a position located along the desired ground track 204), given that estimated current position and the estimated EPU, the actual position of the airplane 202 could theoretically be at any location between and including the left and right edges (208, 210) of the circle. (i.e., could actually be as much as +/−0.9 NM (i.e. 0.9 NM to the left or right) of its indicated current location 202).

Further, the diagram of FIG. 2A demarcates established navigational boundaries relative to the desired course 204. For example, the established navigational boundaries may be Required Navigation Performance (RNP) Boundaries or Area Navigation (RNAV) Boundaries. In FIG. 2A, 1.0* RNP boundaries, such as −1.0* RNP (i.e., the left 1.0* RNP boundary, 212) and +1.0* RNP (i.e., the right 1.0* RNP boundary, 214) are demarcated. As discussed previously, an RNP route (such as the one shown in FIG. 2A) typically requires that the airplane be/remain at or within 1* RNP (ex—be at or within the demarcated boundaries, +/−1.0* RNP, (212, 214)) ninety-five percent (95%) of the time in order to be allowed to travel/use the route, and typically requires that the probability of the aircraft exceeding 2* RNP is no greater than 10E-7. For the aircraft 202 shown in FIG. 2A, even though its estimated current position is indicated as being along the desired course 204, because its EPU is 0.9 NM, the actual position of the airplane may be located a distance as much as 0.9 NM to the left or right of that estimated current position 204. In the scenario pictured in FIG. 2A, this leaves only a 0.1 NM distance between the leftmost or rightmost possible actual positions (as indicated by the left/right edges 208/210) of the circle and the 1.0* RNP boundaries (212, 214). This distance is the allowable FTE (Flight Technical Error) 216 for the aircraft 202.

In the illustrated example, if the airplane 202 were to move to the left or right by more than the allowable FTE (ex—0.1 NM), its leftmost or rightmost possible actual positions may be located beyond the left 1.0* RNP boundary 212 or the right 1.0* RNP boundary 214 respectively. A diagram of such a scenario, would show the circle (indicating the range of possible actual positions given the estimated current position 202 and the EPU 206) such that the left edge 208 or the right edge 210 of the circle would extend beyond the left or right 1.0* RNP boundaries respectively, indicating that the actual position of the plane 202 may be outside/beyond the RNP boundaries (212, 214).

Figure 2B:
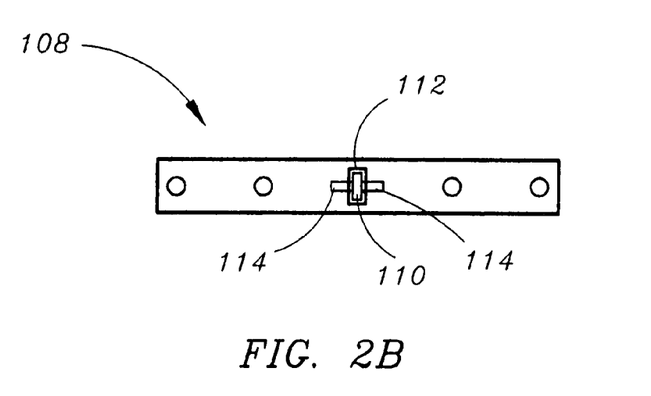
FIG. 2B is a screen shot of a scaled indicator which may be displayed via a display of the system of the present invention, said screenshot depicting how the scaled indicator would appear for an airplane having the estimated current location shown in FIG. 2A, the scaled indicator including an allowable Flight Technical Error (FTE) indicator in accordance with exemplary embodiments of the present invention.

In exemplary embodiments, the display 106 is configured for displaying a scaled indicator, the scaled indicator having been output to the display 106 by the processor 104, the scaled indicator being based upon the stored aircraft position information received by the processor 104 from the memory 102. In present embodiments of the invention, the scaled indicator may be a Course Deviation Indicator (CDI) Scale 108 as shown in FIG. 2B. In current embodiments of the present invention, the Course Deviation Indicator (CDI) Scale 108 may include a current position indicator 110, a desired position indicator 112, and an allowable Flight Technical Error (FTE) indicator 114. In present embodiments of the invention, the current position indicator 110 may be configured for indicating an estimated current position of the aircraft 202. In further embodiments, the desired position indicator 112 may be configured for indicating a desired navigational position for the aircraft, such as along a desired course/ground track 204.

FIG. 2B shows how the displayed CDI scale 108 of the present invention may appear for an aircraft 202 having an estimated current position which is located along a desired course 204. (as is the case in FIG. 2A). For example, the CDI scale 108 of FIG. 2B may be displayed such that its current position indicator 110 (ex—a rectangular bar), said current position indicator 110 corresponding to the estimated current position of the aircraft, is positioned so as to correspond/align with (ex—be located within, directly overlap) the desired position indicator 112 (ex—a hollow rectangular box), said desired position indicator 112 corresponding to the desired navigational position of the aircraft (ex—along the desired navigational course 204), thereby providing a visual indication that the airplane's estimated current position is the same as its desired position (i.e., that the plane is currently estimated to be located/traveling along its desired course).

However, as previously discussed, the estimated current position for the aircraft may be different from its actual position. As discussed previously, EPU may be determined/calculated/provided, such as by the aircraft's navigational system (ex—Flight Management System) or by the system 100 of the present invention, and is a measure of the possible disparity between the indicated/estimated current location of the airplane and its possible actual location. As previously discussed, for the aircraft shown in FIG. 2A, the EPU is equivalent to the radius of the circle shown around it (ex—0.9 NM). Consequently, the actual position of the aircraft, based on its calculated EPU (ex—0.9 NM) and its estimated current position (along the desired course 204) may be any of a number of possible positions located at or between the left and right edges of the circle. As discussed above, given its estimated current position and EPU, the maximum allowable FTE is 0.1 NM (ex—0.1 NM to the left or right). The CDI scale 108 of FIG. 2B includes an allowable FTE indicator 114 (ex—horizontal bar) which is configured for indicating allowable FTE for the aircraft. For instance, the CDI scale 108 of FIG. 2B may be displayed such that its FTE indicator 114 is horizontally positioned on the scale to provide a visual indication of allowable FTE in both the left and right directions (ex—towards the RNP boundaries 212, 214). In exemplary embodiments, the CDI scale 108 may be dimensioned such that full-scale deflection (ex—2 dots) may equal an RNP (or an RNAV) value. As such, the size of the FTE indicator 114 may also provide a pilot with a visual indication as to magnitude of allowable FTE relative to the RNP/RNAV value.

In an exemplary embodiment, the FTE indicator 114 and desired position indicator 112 may be configured as a horizontal sliding display in which the FTE indicator 114 and desired position indicator 112 "move" relative to each other as the aircraft 202 is directed to the left or right. Further, as long as the displayed CDI scale 108 of FIG. 2B depicts at least a portion of the displayed FTE indicator 114 as being located within and/or overlapping the desired position indicator 112, a pilot visually monitoring, the CDI scale 108 may be assured that the leftmost or rightmost possible actual position of the aircraft 202 is currently within the 1* RNP boundaries (212, 214). For instance, because it corresponds to an aircraft positioned along its desired route, the CDI scale 108 displayed in FIG. 2B depicts its FTE indicator 114 and current position indicator 110 as being aligned with respect to the desired position indicator 112 such that the current position indicator 110 is positioned within (ex—centered within) the desired position indicator 112, thereby allowing for a maximum and equivalent amount (ex—0.1 NM) of allowable FTE to be indicated in both the left and right directions. Said FTE indicator may thereby promote increased navigational accuracy and efficiency by providing a pilot with an explicit, visual indication of allowable FTE available in the left and right directions (ex—towards the left, right RNP boundaries 212, 214), thus allowing the pilot to determine how much he or she can adjust/change the course of the aircraft and still be assured that the leftmost or rightmost possible actual position of the aircraft will still remain within 1* RNP boundaries.

Figure 3A:
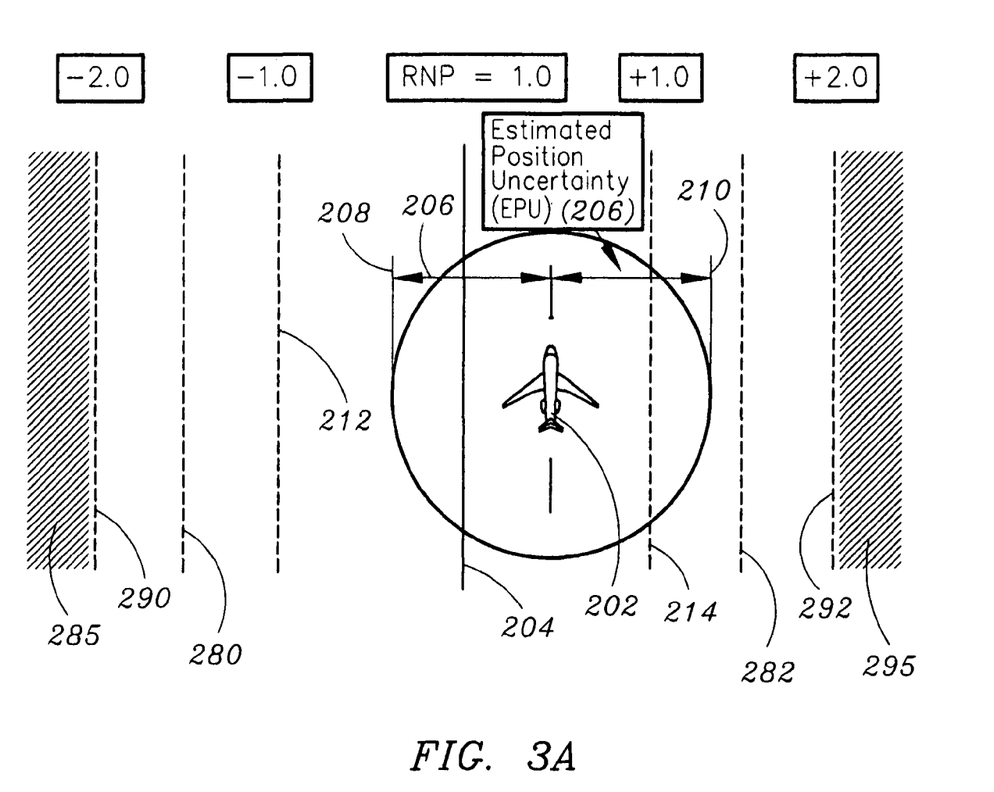
FIG. 3A is a diagram depicting positional information relative to a desired ground track for an airplane implementing the system of the present invention.

FIG. 3A depicts positional information for the aircraft 202 shown in FIG. 2A after the aircraft has deviated, such that its estimated current position is now indicated as being to the right of the desired course/ground track 204. Given the EPU for the aircraft (0.9 NM), the rightmost possible actual position, shown by the right edge 210 of the circle around the aircraft, due to the change in estimated current position, now extends beyond the right 1* RNP boundary (214), indicating that the actual position of the aircraft 202 may be beyond/outside of the 1* RNP boundary (214). As discussed previously, an RNP route (such as the one shown in FIG. 3A) typically requires that the airplane be/remain at or within 1* RNP (ex—be at or within the demarcated boundaries, +/−1.0* RNP, (212, 214)) ninety-five percent (95%) of the time in order to be allowed to travel/use the route.

Figure 3B:
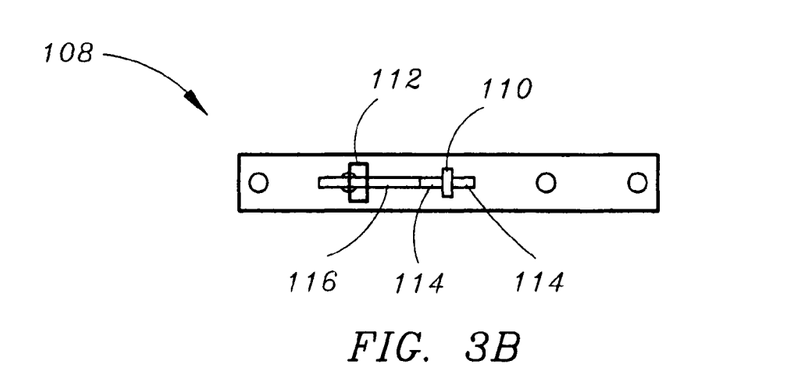
FIG. 3B is a screen shot of a scaled indicator which may be displayed via a display of the system of the present invention, the scaled indicator including an allowable Flight Technical Error (FTE) indicator and a caution indicator in accordance with exemplary embodiments of the present invention.

FIG. 3B shows how the displayed CDI scale 108 of the present invention may appear for an aircraft having an estimated current position which is located as depicted in FIG. 3A. The displayed CDI scale 108 of FIG. 3B now depicts its allowable FTE indicator 114 as no longer being at least partially inside of/overlapping the desired position indicator 112, thereby providing a visual indication to a pilot monitoring the CDI scale 108 that the actual position of the aircraft may be located beyond/outside of the right 1* RNP boundary (214). In further embodiments, (as shown in FIG. 3B), the displayed CDI scale 108 may include a caution indicator 116 when the actual position for the aircraft is determined (based on the estimated current position and calculated EPU for the aircraft) as possibly being located at/on a 1* RNP boundary and/or beyond a 1* RNP boundary. Thus, the caution indicator 116 provides an indication that the actual position of the aircraft 202 may be located at and/or beyond a 1* RNP boundary (212 or 214), thereby indicating to the pilot that corrective action may need to be taken to re-position the plane so that its leftmost or rightmost possible actual position is located back within the 1* RNP boundaries (212, 214). In exemplary embodiments, the caution indicator 116 may be scaled to represent 0.5* RNP value or 0.5* RNAV value. Given that an allowable FTE indicator 114 identifies a point at which the airplane may possibly exceed 1* RNP or 1* RNAV, an outer edge of the caution indicator 116 may identify a point at which the airplane may possibly exceed 1.5* RNP or 1.5* RNAV. As shown in FIG. 3B, the caution indicator 116 may be displayed, for instance, as a horizontally positioned bar which is positioned as a different colored extension of the FTE indicator 114, such that when the displayed CDI scale 108 depicts the caution indicator 116 as being at least partially positioned within/overlapping the desired position indicator 112, the actual position of the plane 202 may be assumed to be possibly at and/or beyond a 1* RNP boundary (212, 214), but within 1.5* RNP boundaries (280, 282). Further, because the displayed CDI scale 108 shown in FIG. 3B depicts the current position indicator 110 as being positioned to the right of the desired position indicator 112, the current position indicator 110 also provides a visual cue to a pilot that the plane may need to be repositioned to the left so that all possible actual positions for the plane fall within RNP boundaries (212, 214).

Figure 4A:
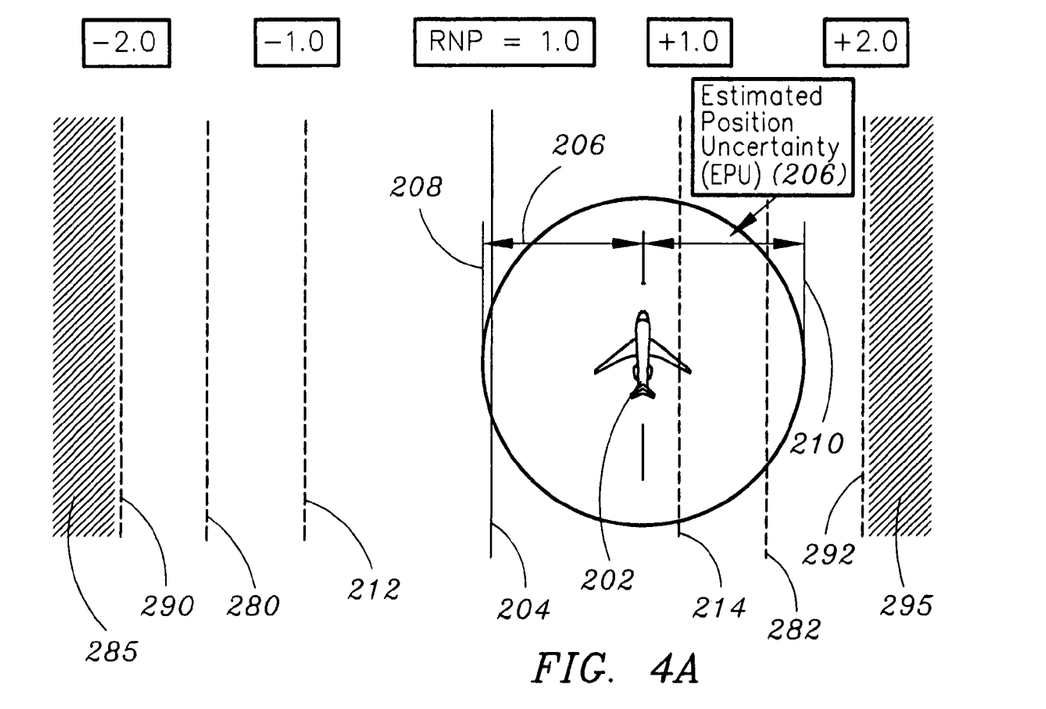
FIG. 4A is a diagram depicting positional information relative to a desired ground track for an airplane implementing the system of the present invention.

In still further embodiments, if the displayed CDI scale 108 depicts both the caution indicator 116 and the FTE indicator 114 as not being at least partially positioned within/overlapping the desired position indicator 112, the actual position of the plane 202 may be assumed to be possibly beyond further boundaries, such as 1.5* RNP boundaries. FIG. 4A depicts this scenario, in which the estimated current position of the plane 202 is well to the right of the desired course 204. Further, given the EPU (0.9 NM) for the plane and its estimated current position, FIG. 4A depicts the plane 202 as possibly having a rightmost possible actual position (as shown by the right edge 210 of the circle) which is between a right 1.5* RNP boundary 282 (ex—+1.5) and a right 2.0* RNP boundary 292 (ex—+2.0).

Figure 4B:
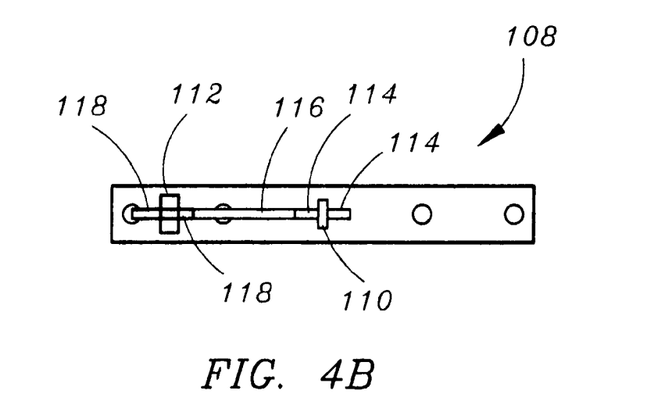
FIG. 4B is a screen shot of a scaled indicator which may be displayed via a display of the system of the present invention, the scaled indicator including an allowable Flight Technical Error (FTE) indicator, a caution indicator, and a warning indicator in accordance with exemplary embodiments of the present invention.

FIG. 4B shows how the displayed CDI scale 108 of the present invention may appear for an aircraft having an estimated current position which is located as depicted in FIG. 4A. The displayed CDI scale 108 of FIG. 4B depicts its FTE indicator 114 as not being at least partially inside of/overlapping the desired position indicator 112, thereby providing a visual indication to a pilot monitoring the CDI scale 108 that the actual position of the aircraft may be located beyond/outside of the right 1* RNP boundary (214). Further, the displayed CDI scale 108 of FIG. 4B now depicts its caution indicator 116 as not being at least partially inside of/overlapping the desired position indicator 112, thereby providing a visual indication to the pilot that a possible actual position of the aircraft may be located beyond/outside of a further boundary, such as the right 1.5* RNP boundary 282. For scenarios such as that shown in FIG. 4A, when the actual position for the aircraft is determined (based on the estimated current position and calculated EPU for the aircraft) as possibly being located at/on a 1.5* RNP boundary and/or beyond a 1.5* RNP boundary (ex—282), the displayed CDI scale 108 may further include a warning indicator 118. Thus, the warning indicator 118 provides an indication that the actual position of the aircraft 202 may possibly be located at and/or beyond a 1.5* RNP boundary (ex—282), thereby indicating to the pilot that immediate corrective action may need to be taken to re-position the plane so that each of its possible actual positions fall within 1.5* RNP boundaries (ex—280, 282) and also within 1.0* RNP boundaries (ex—212, 214).

As shown in FIG. 4B, the warning indicator 118 may be displayed, for instance, as a horizontally positioned bar which is positioned as an extension of the caution indicator 116. In an exemplary embodiment, the warning indicator 118 may be displayed as a different colored bar than the caution indicator 116, for providing a clear, visual indication as to where the caution indicator 116 ends and the warning indicator begins 118. In current embodiments of the present invention, (as shown in FIG. 4B) when the displayed CDI scale 108 depicts the warning indicator 118 as being at least partially positioned within/overlapping the desired position indicator 112, the actual position of the plane 202 may be assumed to be possibly at and/or beyond a 1.5* RNP boundary (such as 282) and approaching a 2.0* RNP boundary (such as 292). In this way, the present invention provides a clear/explicit visual indication to a pilot as to an aircraft's possible actual position beyond a 1.0* RNP boundary. Further, the warning indicator 118 of the present invention provides another degree of warning to the pilot, thereby allowing the pilot the opportunity to utilize the warning indicator 118, in conjunction with the current position indicator 110 and the desired position indicator 112 to take immediate corrective action to reposition the plane so that each of its possible actual positions fall within 1.5* RNP boundaries (280, 282) and 1.0* RNP boundaries (212, 214) and are directed away from 2.0* RNP boundaries (290, 292). The present invention allows such corrective action to be taken prior to having to wait for a navigation system to issue an alert once the possible actual position has reached a 2* RNP boundary (282). This may be particularly useful in a scenario such as in FIG. 4A, where obstacle surfaces (285, 295) are essentially located at the 2.0* RNP boundaries (282, 292) and there is not much margin for pilot error or aircraft deviation. For example, on a 0.1 NM RNP approach, the actual distance between a 1.5* RNP boundary (such as 282) and a 2.0* RNP boundary (such as 292) may be as little as 300 feet.

Figure 5:
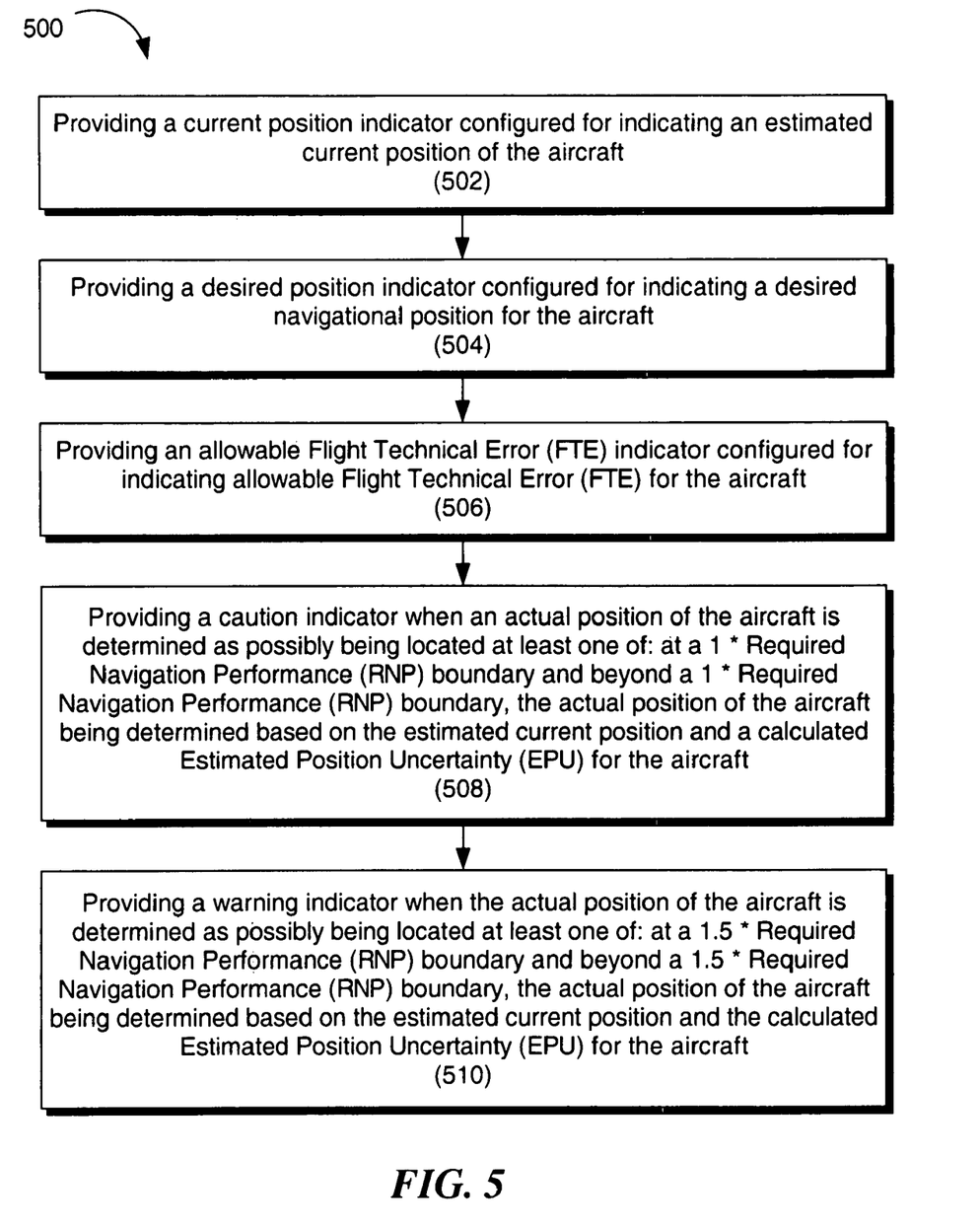
FIG. 5 is a flowchart illustrating a method for promoting accurate navigation of an aircraft in accordance with exemplary embodiments of the present invention.

FIG. 5 illustrates a method for promoting accurate navigation of an aircraft. In an exemplary embodiment, the method 500 may include the step of providing a current position indicator configured for indicating an estimated current position of the aircraft 502. The method 500 may further include the step of providing a desired position indicator configured for indicating a desired navigational position for the aircraft 504. For example, the desired navigational position may be located along a desired ground track. The method 500 may further include the step of providing an allowable Flight Technical Error (FTE) indicator configured for indicating allowable Flight Technical Error (FTE) for the aircraft 506. In current embodiments of the present invention, the current position indicator, the desired position indicator and the FTE indicator are suitable for use by a pilot of the aircraft in maintaining the aircraft within established or pre-established navigational boundaries. For instance, the pre-established navigational boundaries may be Required Navigation Performance (RNP) boundaries.

In exemplary embodiments, the method 500 may further include the step of providing a caution indicator when an actual position of the aircraft is determined as possibly being located at least one of: at a 1* Required Navigation Performance (RNP) boundary and beyond a 1* Required Navigation Performance (RNP) boundary, the actual position of the aircraft being determined based on the estimated current position and a calculated Estimated Position Uncertainty (EPU) for the aircraft 508.

In additional embodiments, the method 500 may further include the step of providing a warning indicator when the actual position of the aircraft is determined as possibly being located at least one of: at a 1.5* Required Navigation Performance (RNP) boundary and beyond a 1.5* Required Navigation Performance (RNP) boundary, the actual position of the aircraft being determined based on the estimated current position and the calculated Estimated Position Uncertainty (EPU) for the aircraft 510.

In exemplary embodiments, the current position indicator, the desired position indicator, the allowable FTE indicator, the caution indicator and the warning indicator may be provided as visible indicators. For example, the current position indicator, the desired position indicator, the allowable FTE indicator, the caution indicator and the warning indicator may be provided as part of a Course Deviation Indicator (CDI) scale 108. In further embodiments, the CDI scale may be dimensioned to at least one of 1* RNAV and 1* RNP at full scale.

In further embodiments, one or more of the caution indicator 116 and the warning indicator 118 may be provided in conjunction with an alert, such as an audible alert via a speaker connected to/integrated with the display 106 when a possible actual position for the aircraft is located at/beyond a 1.0* RNP boundary and/or at/beyond a 1.5* RNP boundary respectively.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for promoting accurate navigation of an aircraft within established navigational boundaries, the established navigational boundaries including Required Navigation Performance (RNP) boundaries, said system comprising:
    a memory configured for storing position information for the aircraft;
    a processor configured for being communicatively coupled with the memory and further configured for receiving the aircraft position information stored in the memory; and
    a display configured for being communicatively coupled with the processor, the display being further configured for displaying a scaled indicator, the scaled indicator being output to the display by the processor, the scaled indicator being based upon the received aircraft position information, the scaled indicator being a Course Deviation Indicator (CDI) scale dimensioned to at least 1* RNP at full scale, the scaled indicator including a current position indicator, a desired position indicator and an allowable Flight Technical Error (FTE) indicator, the current position indicator being configured for indicating an estimated current position of the aircraft, the desired position indicator being configured for indicating a desired navigational position for the aircraft, the FTE indicator configured for indicating allowable Flight Technical Error (FTE) for the aircraft, the scaled indicator further including a caution indicator when an actual position of the aircraft is determined as being located at least one of: at a 1* Required Navigation Performance (RNP) boundary and beyond a 1* Required Navigation Performance (RNP) boundary, the actual position being determined based on the estimated current position and a calculated Estimated Position Uncertainty (EPU) for the aircraft, the scaled indicator further including a warning indicator when the actual position of the aircraft is determined as being located at least one of: at a 1.5* Required Navigation Performance (RNP) boundary and beyond a 1.5* Required Navigation Performance (RNP) boundary, the actual position being determined based on the estimated current position and the calculated Estimated Position Uncertainty (EPU) for the aircraft,
    wherein the scaled indicator, the current position indicator, the desired position indicator the FTE indicator, the caution indicator, and the warning indicator are suitable for use by a pilot of the aircraft in maintaining the aircraft within the established navigational boundaries, the FTE indicator being a bar indicator overlaid onto the CU scale for providing an explicit, visual indication of allowable FTE in multiple directions.

2. The system as claimed in claim 1, wherein the current position indicator, desired position indicator, allowable FTE indicator, caution indicator and warning indicator are provided as visible indicators.

3. The system as claimed in claim 2, wherein the desired navigational position is located along a desired ground track.

4. A method for promoting accurate navigation of an aircraft within established navigational boundaries, the established navigational boundaries including Required Navigation Performance (RNP) boundaries, the method comprising:
    using a computer or processor of a navigation system to perform the steps of:
    providing a current position indicator configured for indicating an estimated current position of the aircraft;
    providing a desired position indicator configured for indicating a desired navigational position for the aircraft;

providing an allowable Flight Technical Error (FTE) indicator configured for indicating allowable Flight Technical Error (FTE) for the aircraft;

providing a caution indicator when an actual position of the aircraft is determined as being located at least one of: at a 1* Required Navigation Performance (RNP) boundary and beyond a 1* Required Navigation Performance (RNP) boundary, the actual position of the aircraft being determined based on the estimated current position and a calculated Estimated Position Uncertainty (EPU) for the aircraft; and providing a warning indicator when the actual position of the aircraft is determined as being located at least one of: at a 1.5* Required Navigation Performance (RNP) boundary and beyond a 1.5* Required Navigation Performance (RNP) boundary, the actual position of the aircraft being determined based on the estimated current position and the calculated Estimated Position Uncertainty (EPU) for the aircraft, wherein the current position indicator, the desired position indicator, the FTE indicator, the caution indicator and the warning indicator are provided as part of a Course Deviation Indicator (CDI) scale, are displayed via a display of the navigation system and are suitable for use by a pilot of the aircraft in maintaining the aircraft within the established navigational boundaries, the FTE indicator being a bar indicator overlaid onto the CU scale for providing an explicit, visual indication of allowable FTE in multiple directions.

5. The method as claimed in claim 4, wherein the current position indicator, desired position indicator, allowable FTE indicator, caution indicator and warning indicator are provided as visible indicators.

6. The method as claimed in claim 5, wherein the desired navigational position is located along a desired ground track.

7. A non-transitory computer-readable storage medium having computer-executable instructions for performing a method for promoting accurate navigation of an aircraft within established navigational boundaries, the established navigational boundaries including Required Navigation Performance (RNP) boundaries, said method comprising:

providing a current position indicator configured for indicating an estimated current position of the aircraft;

providing a desired position indicator configured for indicating a desired navigational course for the aircraft;

providing an allowable Flight Technical Error (FTE) indicator configured for indicating allowable Flight Technical Error (FTE) for the aircraft;

providing a caution indicator when an actual position of the aircraft is determined as being located at least one of: at a 1* Required Navigation Performance (RNP) boundary and beyond a 1* Required Navigation Performance (RNP) boundary, the actual position of the aircraft being determined based on the estimated current position and a calculated Estimated Position Uncertainty (EPU) for the aircraft; and providing a warning indicator when the actual position of the aircraft is determined as being located at least one of: at a 1.5* Required Navigation Performance (RNP) boundary and beyond a 1.5* Required Navigation Performance (RNP) boundary, the actual position of the aircraft being determined based on the estimated current position and the calculated Estimated Position Uncertainty (EPU) for the aircraft, wherein the current position indicator, the desired position indicator and the FTE indicator are provided as part of a Course Deviation Indicator (CDI) scale and are suitable for use by a pilot of the aircraft in maintaining the aircraft within the established navigational boundaries, the FTE indicator being a bar indicator overlaid onto the CDI scale for providing an explicit, visual indication of allowable FTE in multiple directions.

8. The computer-readable medium having computer-executable instructions for performing a method as claimed in claim 7, wherein the current position indicator, desired position indicator, allowable FTE indicator, caution indicator and warning indicator are provided as visible indicators.

9. The computer-readable medium having computer-executable instructions for performing a method as claimed in claim 8, wherein the desired navigational course is located along a desired ground track.

* * * * *